United States Patent Office 3,801,657
Patented Apr. 2, 1974

3,801,657
DIRECT CRYSTALLIZATION OF ALUMINUM HYDRIDE FROM TOLUENE-ETHER
James A. Scruggs, West Haven, Conn., assignor to the United States of America as represented by the Secretary of the Army
No Drawing. Filed Jan. 15, 1969, Ser. No. 791,526
Int. Cl. C01b 6/00
U.S. Cl. 423—645                    10 Claims

ABSTRACT OF THE DISCLOSURE

Crystalline aluminum hydride can be produced by direct precipitation from ether-toluene solutions if a certain ether-toluene ratio and proper reactant ($LiAlH_4$, $LiBH_4$ and $AlCl_3$) concentrations are employed together with proper distillation procedures. The crystalline product formed thereby possesses improved properties for use in propellant compositions.

---

This invention relates to a novel process for producing crystalline aluminum hydride, and in particular to such a process wherein the aluminum hydride can be produced directly from an ether-toluene solution.

Various forms of crystalline unsolvated aluminum hydride exist. They are named according to the maximum absorption in the infrared; e.g., aluminum hydride(58) absorbs strongest at 5.8 microns.

It has been definitely established that aluminum hydride(58) is the preferred form of final unsolvated aluminum hydride for propellant application.

Aluminum hydride can be produced by the reaction of $LiAlH_4$ with $AlCl_3$ in an ether-toluene medium if $LiBH_4$ is used as a seeding ingredient. After the reaction step, the steps of desolvation, conversion and crystallization are carried out. With the use of various ratios of ether to toluene two processes have been investigated and developed for desolvating, converting and crystallizing aluminum hydride. These are the vacuum-atmospheric and atmospheric processes.

Since the particular form of aluminum hydride obtained from a synthetic process and the properties thereof are extremely important when the aluminum hydride is desired for propellant application, processes other than the vacuum-atmospheric and atmospheric processes have been investigated. Hence, the direct crystallization method evolved from effort in discovering processes to yield a product with desirable properties for use in propellants.

Accordingly, it is the principal object of this invention to produce crystalline aluminum hydride(58) directly from ether-toluene solutions.

It is a particular object of this invention to produce a crystalline aluminum hydride product possessing improved properties for use in propellant compositions.

SUMMARY OF THE INVENTION

Crystalline aluminum hydride can be produced by direct precipitation from ether-toluene solutions if a certain toluene:ether ratio and proper reactant ($LiAlH_4$, $LiBH_4$ and $AlCl_3$) and concentrations are employed together with proper distillation procedures.

DESCRIPTIONS OF THE PREFERRED EMBODIMENTS

Crystalline aluminum hydride can be produced directly from ether-toluene solutions. However, to accomplish this involves the overcoming of a number of major problems. The direct crystallization of desolvated aluminum hydride from ether-toluene solutions has four major problems:

(1) Concentration of reactants or dilution

If the solution is too concentrated with reactants, solvated aluminum hydride precipitates before desolvation temperatures are reached.

(2) Additive ($LiAlH_4$ and $LiBH_4$) ratio

If the ratios of $LiAlH_4$ and/or $LiBH_4$ to $AlH_3$ are too high or too low desolvation and/or crystallization will not occur.

(3) Ether to toluene ratio

There is a certain ether:toluene ratio in which the reaction must be carried out or premature precipitation will occur.

(4) Ether content before achieving desolvation temperatures

Too much ether will cause the formation of a crystalline aluminum hydride which is undesirable, or prevent desolvation altogether. Too little ether will precipitate solvated aluminum hydride before desolvation temperatures are reached.

This invention will best be understood by reference to the following detailed examples of this invention which are included for purposes of illustration to show how the above problems are solved. Several examples will follow which list the preferred ranges of concentrations, times, temperatures, and pressures pertinent to the processes of this invention.

EXAMPLE NO. 1

Reagents
(1) $LiAlH_4$
(2) $AlCl_3$
(3) Ether (diethyl) distilled over $LiAlH_4$
(4) Toluene dried with an ether solution of $LiAlH_4$
(5) $LiBH_4$ Apparatus
(1) Reaction vessel—a three liter and one neck round bottom flask.
(2) Distillation and desolvation vessel—a three liter and three neck round bottom flask fitted with a "Lew" magnetic stirrer, a distillation head, a water-cooled condenser and a two liter round bottom flask as a receiver. The receiver is cooled with Dry Ice/acetone.

Procedure

All reactions are carried out in the dry box. To the reaction flask is added 3.6 grams (0.0906 mole) of $LiAlH_4$ and 315 milliliters of ether. While stirring this solution, 227 milliliters of a 1.015 molar $AlCl_3$ in ether solution is added, preceded by 16 milliliters of approximately 1 molar $LiBH_4$ in ether. This reaction mixture is then diluted with 2100 milliliters of dry toluene. The reaction mixture is then filtered and processed as shown below:

| Time (min.) | Bath temp. (° C.) | Pot temp. (° C.) | Pressure | Remarks |
|---|---|---|---|---|
| 0 | 50 | 36 | 175 mm. Hg | |
| 12 | 66 | 46 | 195 mm. Hg | |
| 25 | 61 | 40 | 95 mm. Hg | |
| 26 | 61 | 40 | 85 mm. Hg | |
| 27 | 61 | 45 | Atmospheric | Percent ether–5.0% (by weight). |
| 30 | 75 | 54 | do | |
| 55 | 85 | 82 | do | Slightly cloudy. |
| 220 | 93 | 82 | do | First crystals.[1] |
| 280 | 95 | 82 | do | |

[1] (X-ray analysis; strong aluminum hydride (58)—about 75%. Some aluminum hydride (60)—about 25%.

The product is filtered, washed with dry ether and dried under vacuum. X-ray analysis shows the product to be aluminum hydride(58).

EXAMPLE NO. 2

Reagents

Same.

Apparatus

Same.

Procedure

To the reaction flask is added 624 milliliters of ether and 33 milliliters of a 1.022 molar solution of $AlCl_3$ in ether. The solution is stirred and 6.7 grams of solid $LiAlH_4$ is added over a period of 15 minutes. The reaction is allowed to be stirred for 15 minutes more and 43 milliliters of a 1.022 molar $LiBH_4$ in ether solution is added. After stirring for 15 minutes more, 2100 milliliters of toluene are added. The resulting reaction mixture is filtered and processed as shown below:

| Time (min.) | Bath temp. (° C.) | Pot temp. (° C.) | Pressure (mm. Hg) | Remarks |
|---|---|---|---|---|
| 0 | 65 | 45 | 310 | |
| 10 | 65 | 50 | 220 | |
| 20 | 68 | 50 | 160 | About 7 to 8% ether (by weight). |
| | ([1]) | | | |
| 35 | 92 | 75 | 460 | |
| 65 | 104 | 97 | 730 | Crystals formed.[2] |
| 80 | 104 | 100 | Atmospheric | End of heating.[3] |

[1] Started up to 100° C.
[2] (X-ray analysis; aluminum hydride(60) and aluminum hydride(58).).
[3] (X-ray analysis; product all aluminum hydride(58).)

The aluminum hydride concentration can be varied up to approximately 0.7 moles/liters with the preferred range being 0.1 to 0.5 moles/liter.

The $LiAlH_4/AlH_3$ molar ratio can vary from 1/12 to 1/3 with the preferred range being 1/5 to 1/4.

The $LiBH_4/AlH_3$ molar ratio can vary from 1/6 to 1/3.

The toluene/ether dilution volume ratio can vary from 1/1 to 6/1 with the preferred range being 3/1 to 6/1.

The usual operating procedure with the solvent pair (ether-toluene) involves ether-stripping at 40° C. (vacuum) to approximately 5.0 weight percent ether in toluene, adjustment of the system to ambient pressure, and then heating of the clear solution at 80–82° C. The time (80–82° C.) at which crystallization begins can vary over a wide range (5–120 minutes). The reasons for the time fluctuations have not been fully understood. In some systems, the ether content may have to be reduced to 2.5–3.0 weight percent to affect precipitation. The bulk density of the precipitated product generally averages from about 0.6–0.7 grams/ml., and is classified as microcrystalline.

The usual operating procedure with the solvent pair (ether-benzene) also involves ether-stripping at 40° C. (vacuum) to approximately 5.0 weight percent ether in benzene; however, the conversion temperature (78° C.) and additive ratios required to obtain the desired product, are different than for the ether-toluene solvent pair. Higher excesses of $LiBH_4$ (25–35%) prompts the direct crystallization of unsolvated aluminum hydride from solution when the $LiAlH_4$ excess is varied from 12 to 30%. The product, when the $LiAlH_4$ excess is above 12 percent, appears to be somewhat smaller and more agglomerated.

No examples are included for the ether-benzene solvent pair since the toluene-ether system offers a number of distinct advantages. Among these are greater flexibility in ether concentrations and wider temperature ranges for effecting conversion.

The aluminum hydride prepared by the direct crystallization of desolvated material has a high surface area which absorbs a considerable amount of binder and/or plasticizer when used in propellants. Since it compacts well, the microcrystalline product is readily compressed into pellets which offers other formulation properties when used in propellant compositions. The aluminum hydride formed by direct crystallization is more thermally stable and less sensitive to water and air. The thermal stability is measured by heating under vacuum and measuring the amount of hydrogen gas evolved.

I claim:

1. A process of producing microcrystalline aluminum hydride having a maximum absorption in the infrared at 5.8 microns by direct precipitation from a solution of aluminum hydride in diethyl ether and toluene comprising the steps of:

(a) reacting $LiAlH_4$, $LiBH_4$, and $AlCl_3$ in a solution of diethyl ether to form $AlH_3$;
    (b) diluting said diethyl ether solution with dry toluene to provide a toluene-ether solution ratio of toluene to ether in the range of about 1/1 to about 6/1;
    (c) filtering said toluene-ether solution;
    (d) heating and distilling said filtered solution until the percentage of said diethyl ether in said filtered solution is reduced to no more than about 5 percent by weight;
    (e) continuing to heat said filtered solution until a precipitate is formed;
    (f) filtering said filtered solution, thereby separating said precipitate from said filtered solution; and,
    (g) drying said precipitate constituted substantially of microcrystalline aluminum hydride, said microcrystalline aluminum hydride characterized by having a maximum absorption in the infrared at 5.8 microns.

2. The process of claim 1 wherein after said diethyl ether solution is diluted with said dry toluene, the $LiAlH_4/AlH_3$ molar ratio is maintained from about 1/6 to about 1/3.

3. The process of claim 2 wherein the aluminum hydride concentration is less than about 0.7 gram moles/liter.

4. The process of claim 3 wherein said percentage of said diethyl ether is reduced to about 3 percent by weight by said continuing to heat.

5. The process of claim 4 wherein the said continuing to heat said solution occurs at about atmospheric pressure at about 82° C.

6. The process of claim 1 wherein the $LiAlH_4/AlH_3$ molar ratio is maintained from about 1/5 to about 1/4, and the $LiBH_4/AlH_3$ molar ratio is maintained from about 1/6 to about 1/3.

7. The process of claim 6 wherein the aluminum hydride concentration is from about 0.1 to about 0.5 gram moles/liter.

8. The process of claim 7 wherein said percentage of said diethyl ether is reduced to about 3 percent by weight by said continuing to heat.

9. The process of claim 8 wherein the said continuing to heat said solution occurs at about atmospheric pressure at about 82° C.

10. The process of claim 9 wherein the said aluminum hydride concentration is about 0.26 gram moles/liter and the said continuing to heat said solution is for at least about two hours.

References Cited

UNITED STATES PATENTS

| | | | |
|---|---|---|---|
| 3,453,093 | 7/1969 | Kobetz et al. | 23—365 |
| 3,473,899 | 10/1969 | Cooper | 23—204 |
| 3,664,811 | 5/1972 | Scruggs | 423—645 |
| 3,751,566 | 8/1973 | Churchill | 423—645 |

OTHER REFERENCES

Lithium Aluminum Hydride, Aluminum Hydride, and Lithium Gallium Hydride, and Some of Their Applications, In Organic and Inorganic Chemistry, Finholt, A. E. et al., May 1947.

CARL D. QUARFORTH, Primary Examiner

P. A. NELSON, Assistant Examiner